United States Patent [19]

Toriumi et al.

[11] Patent Number: 4,616,262

[45] Date of Patent: Oct. 7, 1986

[54] METHOD AND APPARATUS FOR FORMING A COMBINED IMAGE SIGNAL

[75] Inventors: Wataru Toriumi, Hiratsuka; Hideyuki Shoji, Niiza; Yoshihiko Inoue, Iruma; Soji Shiba, Urawa; Yasuhiko Ushio, Tokyo, all of Japan

[73] Assignee: Dainippon Ink and Chemicals, Incorporated, Tokyo, Japan

[21] Appl. No.: 551,100

[22] Filed: Nov. 14, 1983

[51] Int. Cl.$^4$ ............................................... H04N 5/22
[52] U.S. Cl. ...................................... 358/183; 340/716; 358/22
[58] Field of Search ................... 358/182, 183, 22; 364/518; 340/705, 716, 723, 734, 793; 382/1

[56] References Cited

U.S. PATENT DOCUMENTS

| | | | |
|---|---|---|---|
| 3,673,324 | 6/1972 | Ito et al. | 358/22 |
| 3,941,925 | 3/1976 | Busch et al. | 358/183 |
| 4,141,041 | 2/1979 | Peters | 358/183 |
| 4,266,242 | 5/1981 | McCoy | 358/22 |
| 4,439,783 | 3/1984 | Nishikawa | 358/183 |

*Primary Examiner*—Leo H. Boudreau
*Assistant Examiner*—Joseph Mancuso
*Attorney, Agent, or Firm*—Robert E. Burns; Emmanuel J. Lobato; Bruce L. Adams

[57] ABSTRACT

A process and an apparatus for forming a combined image signal from a plurality of image signals representative of a plurality of images to be combined are disclosed. One of the image signals representative of one of the neighboring images with respect to its image density within a predetermined distance from an interface between said neighboring images is modified so that the image density is gradually varied from the predetermined distance toward the interface at a desired rate of variation.

13 Claims, 39 Drawing Figures

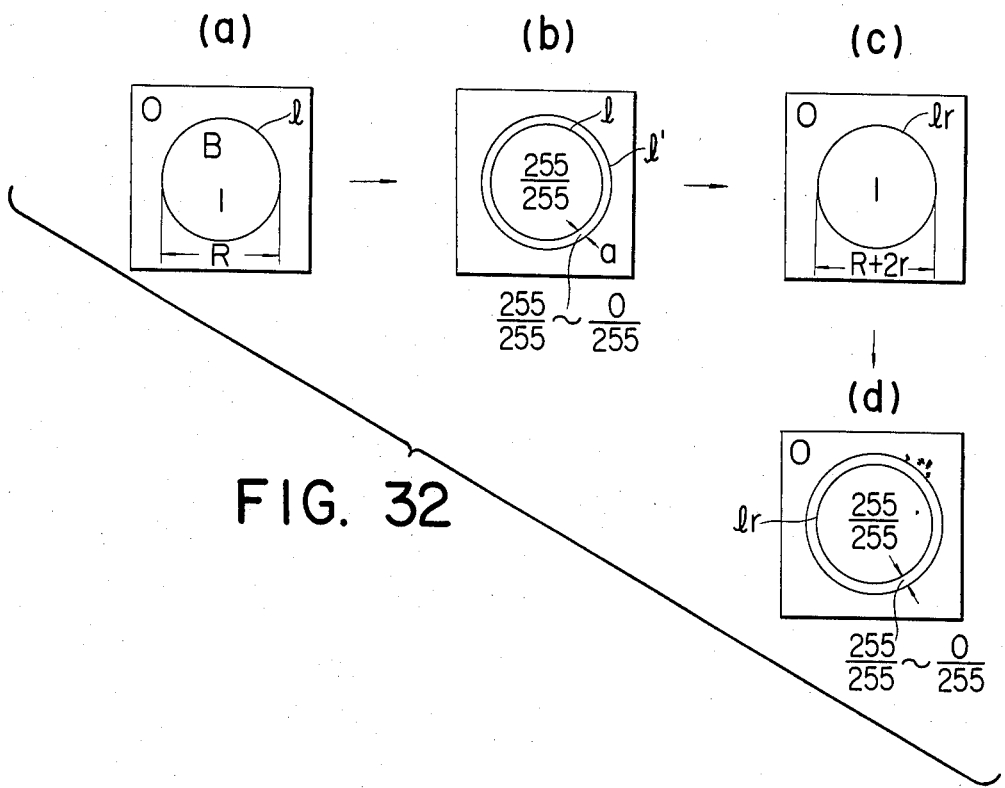
FIG. 32
FIG. 33
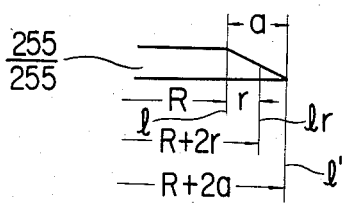
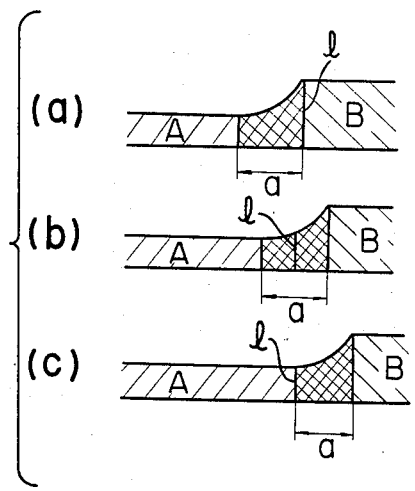
FIG. 34

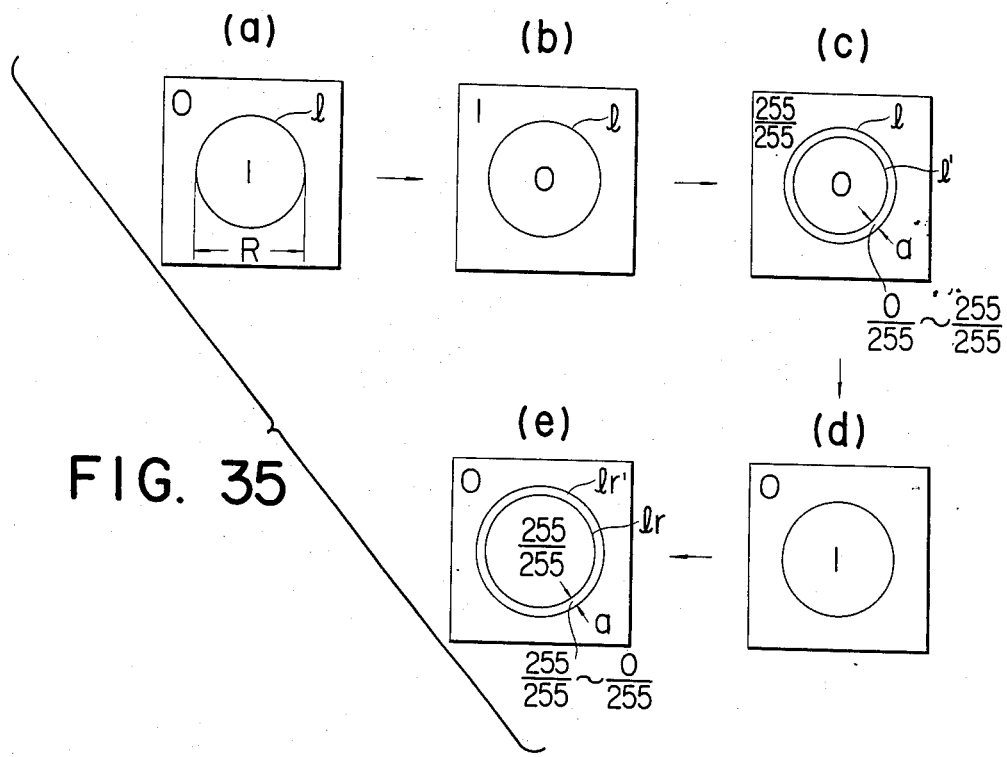
FIG. 35
FIG. 36
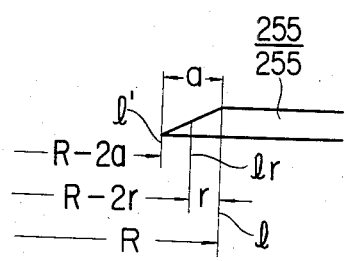
FIG. 37
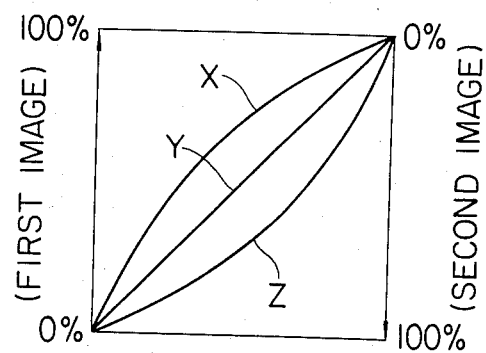

METHOD AND APPARATUS FOR FORMING A COMBINED IMAGE SIGNAL

BACKGROUND OF THE INVENTION

This invention relates to methods and apparatus for forming a combined image signal from a plurality of image signals representative of a plurality of images, and more particularly, to methods and apparatus for forming a combined image signal in which the density differences at the interface of the combined images are smoothed.

In the art of printing and in various modes of display, the formation of a combined image by inserting or overlapping is carried out. However, when a relatively large difference exists between the density of the image pixel at the opposite sides of the interface between the images, it is often observed as if line information other than the image information exists at the interface, creating an awkward impression.

In order to eliminate the above undesirable effect, a smoothing process utilizing an electronic computer has heretofore been carried out. When an image of an aircraft parked on an apron in a first picture is combined with an image of sky with floating clouds in a second picture to obtain a combined image of an aircraft flying in the sky, a mask of 1 bit with a 1 level within the contour of the aircraft and a 0 level outside of the aircraft image is prepared from the image of the aircraft on the ground. This mask is used to determine where the image of the aircraft alone should be placed in the image of the sky, and the interface and its vicinity in the combined images is densitygradated along the contour of the aircraft image combined with the sky image by an averaging method or an interpolating method.

The above described steps are carried out by a layout scanner system (an image processing system using a computer), but in the conventional system the image information that is displayable on the color monitor which plays an important role in image processing, is limited by the capacity of the image memory. Therefore, massive image information is compressed or eliminated at intervals to be displayed on the color monitor for easy processing, and the information processed through the use of the eliminated information must be converted back to a source data (image information input from or ourput into a scanner). This conversion may be simple or may be difficult or impossible if the latter is the case, the source data is displayed on the color monitor, but the image memory cannot store all of the source data. Therefore the source data is divided into several sections so that they can be displayed on the color monitor. The previously described conventional smoothing method corresponds to the case where conversion into the source data is difficult. In the conventional method, 1 bit mask is used to carry out the averaging method and the interpolating method, it is not possible to include the data from both image in the density-gradated region.

Therefore, according to the conventional smoothing method the smoothing is carried out by dividing the source data of the combined image into several sections and displaying them on a color monitor several times, thus requiring an inconveniently long time.

Also, although the density of the pixel to which the smoothing process has been effected is smoothly corrected, the image information expressed by the density change is disadvantageously eliminated.

SUMMARY OF THE INVENTION

Accordingly, an object of the present invention is to provide a process and an apparatus for forming a combined image signal in which the image pixel density in the vicinity of the interface between the images to be combined can be corrected so as to be smoothly varied at any desired conversion factor without losing the image information.

Another object of the invention is to provide a process and an apparatus for forming a combined image signal in which the image in the vicinity of the interface between the combined images is gradated without impairing the image information.

Still another object of the present invention is to provide a process and an apparatus for forming a combined image signal capable of providing in a relatively short time a combined image signal in which the image in the vicinity of the interface between the combined images is gradated without impairing the image information.

BRIEF DESCRIPTION OF THE DRAWINGS

The present invention will become more readily apparent from the following description of the preferred embodiment of the invention, taken in conjunction with the accompanying drawings, in which:

FIGS. 32(a) to 32(d) are views showing how an expanded 8 bit mask signal is prepared from 1 bit mask signal;

FIG. 33 is a view explaining the level of the 8 bit mask signal shown in FIG. 32;

FIG. 34 is a graph illustrating the density expressed in height in the vicinity of the interface of the combined images;

FIGS. 35(a) to 35(e) are views showing how a contracted 8 bit mask signal is prepared from the 1 bit mask signal;

FIG. 36 is a graph showing the level of the 8 bit mask signal expressed in height; and FIG. 37 is a graph showing the density conversion factor curves.

DESCRIPTION OF THE PREFERRED EMBODIMENTS

Figure 1:
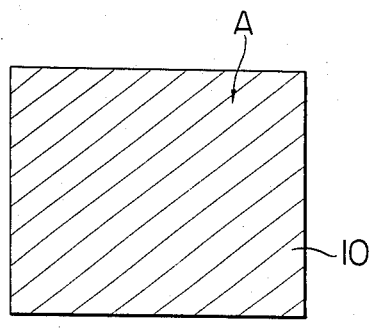
FIG. 1 is a view showing an image A.
Figure 2:
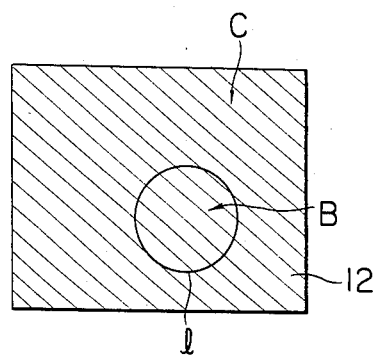
FIG. 2 is a view showing an image C to be combined with the image A.
Figure 3:
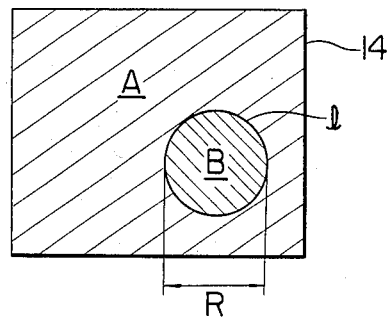
FIG. 3 is a view showing a combined image in which the images A and B are combined.
Figure 4A:
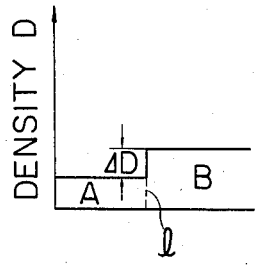
FIGS. 4a, 4b and 4c are graphs illustrating the density differences of the images on the opposite sides of the interface of the combined images.
Figure 4B:
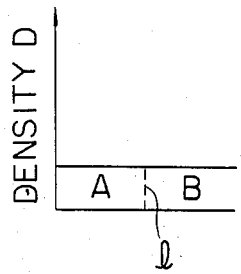
Figure 4C:
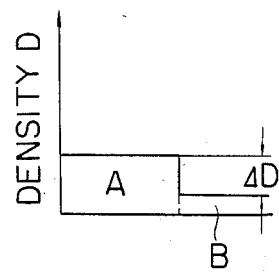

Referring to the drawings and in particular to FIGS. 1 to 3 thereof, it is assumed that an image A of a picture 10 of FIG. 1 is to be combined with an image B included in an image C of a picture 12 of FIG. 2 in order to obtain a picture 14 of a combined image shown in FIG. 3. It is also assumed that the pictures 10 and 12 may be color or monochrome and that they consist of a plurality of image pixels having a density gradation of 256 grades. The picture 14 includes an interface 1 between the image A and the image B, and the density of the image pixels on the opposite sides of the interface 1 can be different along the interface 1 as shown in the graphs of FIGS. 4a to 4c. FIG. 4a shows that the density of the image A is lower than that of the image B by ΔD at this position, FIG. 4b shows that the densities are equal, and FIG. 4c shows that the density of the image A is higher than that of the image B by an amount ΔD at this position.

Figure 5:
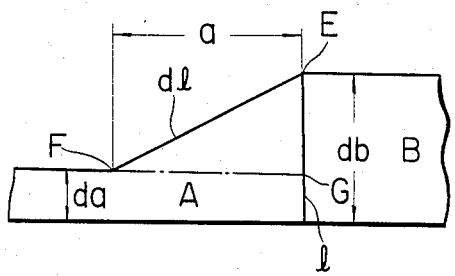
FIG. 5 is a graph illustrating the smoothed density difference between the cobmined images.

FIG. 5 illustrates how the abrupt change in the density between the images A and B can be smoothed according to the present invention in the case shown in FIG. 4a. It can be seen from the figure that the density of the image B at the point E on the interface 1 is db and the density of the image A at the point F spaced by a distance a from 1 is da (db>da), and that the density of the image pixels that are present between the interface 1 and the point F is gradually increased to reach the point E where the density of the image B is equal to the density of the image pixels. The above distance a is referred to "gradation width".

Figure 6:
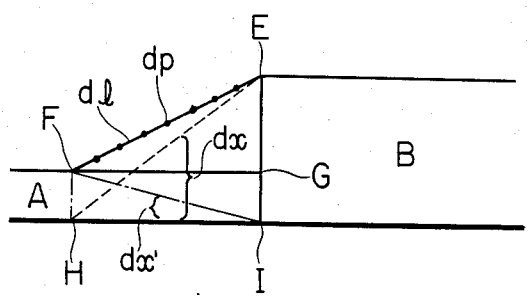
FIG. 6 is a view useful in explaining the method for determining the density slope line dl shown in FIG. 5.
Figure 7:
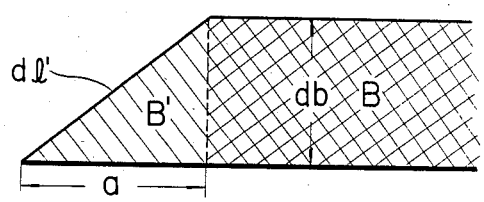
FIG. 7 is a graph illustrating the density of the image B after density correction.
Figure 8:
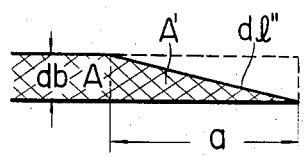
FIG. 8 is a graph illustrating the density of the image A after the density correction.

FIG. 6 illustrates one process for obtaining a density slope dl shown in FIG. 5, which is obtained by connecting a plurality of points dp that are generated by adding the vertical components dx' of a triangle FHI to the vertical components dx of a triangle EHI. FIGS. 7 and 8 show the constituent elements of the density slope shown in FIG. 6, and in FIG. 7, the image B having a density db has attached thereto at the interface 1 an additional image pixel group B' which consists of a plurality of image pixel that gradually decrease their density value from the interface 1 to the point along gradation width a where the density is zero. FIG. 8 shows the image A which has a sloped portion A' in which the density gradually decreases from da to zero along the gradation width a to the interface 1.

It is to be noted that, while the additional image pixel group B' shown in FIG. 7 is composed of image pixels that have a constant density slope and includes no image information, the sloped density portion A' of the image A in FIG. 8 includes the image information that is contained in the original image A because this portion A' is formed by multiplying each image element density at the respective points within the distance a from the interface 1 by a predetermined constant density conversion factor. This density conversion factor is operated according to the gradation mask pattern. Therefore the line dl shown in FIG. 5 is typically not a straight line but a curve that is formed from the image information of the corresponding portion of the image A and the density conversion factor.

Figure 9:
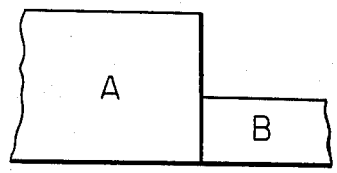
FIGS. 9 to 13 are views similar to FIGS. 5 to 8 but illustrating where the density is higher in the image A than the image B.
Figure 10:
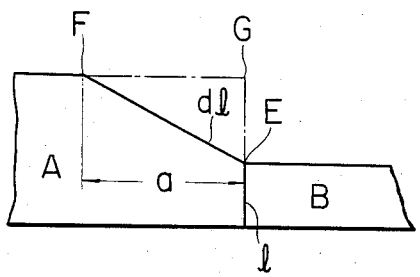

FIG. 9 shows an example where the density of the image A is higher than the density of the image B. In this case, the density of the image pixels within the distance a from the interface 1 is gradually decreased from the point F to the point E as shown in FIG. 10.

Figure 11:
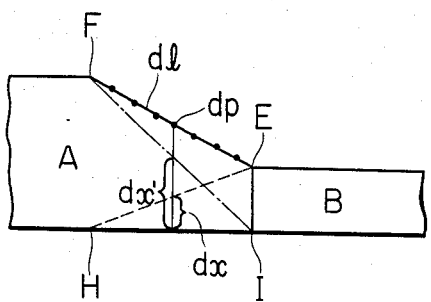
Figure 12:
Figure 13:
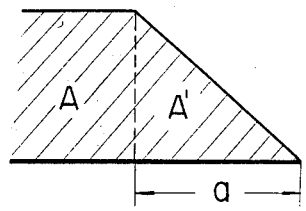
Figure 14:
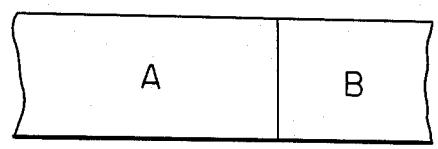
FIGS. 14 and 15 are graphs illustrating the density where the image A and the image B have the same density values.
Figure 15:
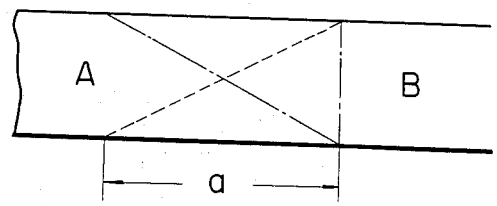

FIGS. 11 to 13 are graphs similar to those in FIGS. 6 to 8 and illustrating how the combined images A and B can be modified in the vicinity of the interface 1. FIGS. 14 and 15 show the interface 1 between the images A and B where the densities at the opposite sides of the interface 1 are equal to each other. In this case no substantial change appears even after the density correction operation according to the present invention.

According to the present invention, an operating unit is utilized to formulate and attach the additional image pixel group B' to the image B, and the B' region is obtained by arranging at predetermined intervals the density values generated by multiplying the density db of the image B by the density conversion factor in the form of a percentage that gradually decreases from 100% to 0%. The density conversion factor can be varied linearly, or it may be varied non-linerarly. In the illustrated example, the density conversion factors are linearly varied.

The portion A' of the image A shown in FIG. 8 may be obtained by multiplying the densities of each point falling between the points F and G by numbers complementary to the density conversion factor used in forming the additional image pixel group B'. The portion A' thus prepared contains the image information of the original image A.

When a combined image is formed according to the present invention, the density conversion is carried out with the image information of the image within the gradation width a maintained. Also the same operation can be applied irrespective of which side of interface 1 has a higher density and when the densities of both sides are equal.

Figure 16:
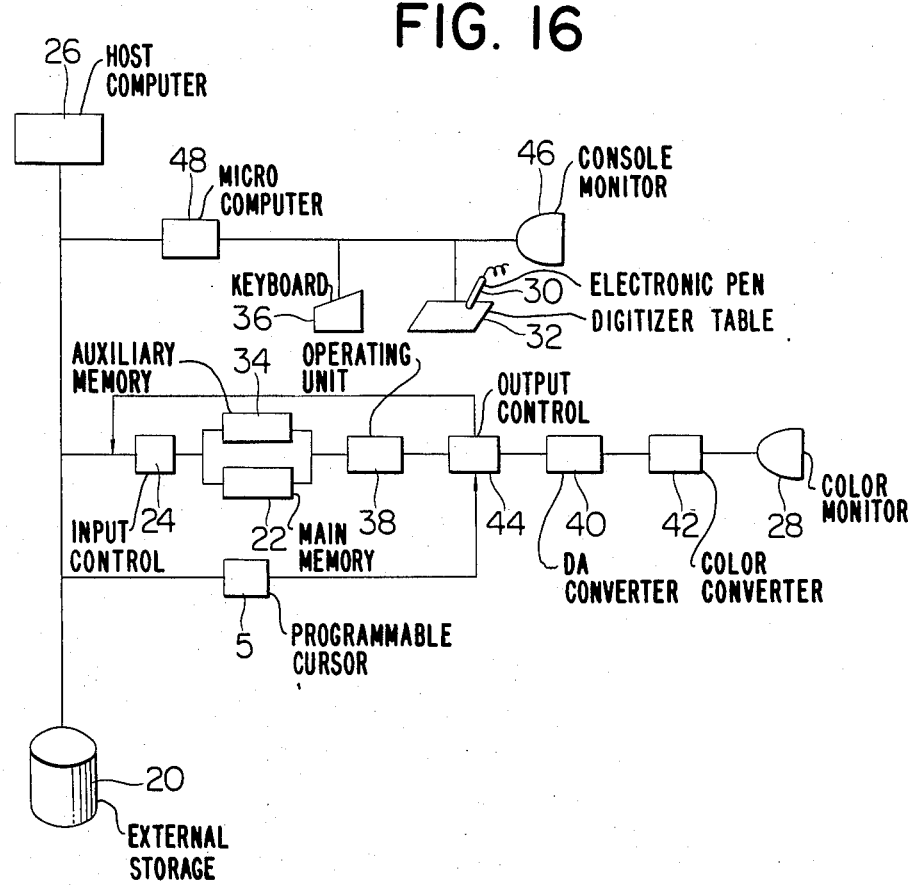
FIG. 16 is a block diagram of the apparatus of the present invention.

FIG. 16 illustrates in a block diagram an apparatus for forming a combined image according to the present invention. The description will now be made as to the process of the present invention in conjunction with the block diagram shown in FIG. 16.

In order to obtain a combined image signal or a combined image through the use of the apparatus of the present invention, the following three methods can be used. The first method is to directly prepare and use an 8 bit gradation mask without preparing a 1 bit mask; the second method is to prepare a 1 bit mask which is then swept automatically by a programmable cursor 5 to convert it into an 8 bit gradation mask; and the third method is the one in which, instead of the automatic sweep of the second method, a desired portion only is manually gradated.

Figure 17:
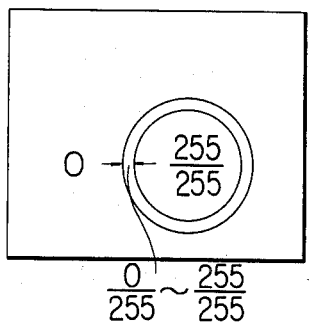
FIG. 17 is a view showing the 8 bit mask.

The above first method comprises the following four steps:

(1) Image information stored in an external storage 20 such as a magnetic disk or tape is written in to a main memory 22 as the source data itself or as compressed data through an input control unit 24 under the control of a host computer 26. Then the images B and C stored in the main memory 22 and a cross-hair cursor designating the output position of the programmable cursor 5 and the gradation width a are displayed on a color monitor 28. Then an electronic pen 30 is moved on a digitizer table 32 so that the center of the cross-hair cursor moves along the interface 1 between the images B and C displayed on the color monitor 28, and the contents of the programmable cursor 5 in which information such as the gradation width a and the gradation pattern are sequentially stored in an auxiliary memory 34, thereby generating a gradation mask signal Sb as shown in FIG. 17. This gradation mask is formed as an 8 bit mask in order that a density signal level of 256 grade levels can be achieved. When the gradation mask is formed in the auxiliary memory 34, the corrected image B having the gradated image portion B' as shown in FIG. 7 at the outside of the image B along contour can be displayed on the color monitor 28, or the image C alone without the image portion B can be displayed through the use of an unillustrated switch, so that the completion of the operation and the quality of the finish can be confirmed. This confirmation can be achieved even during the operation.

Figure 18:
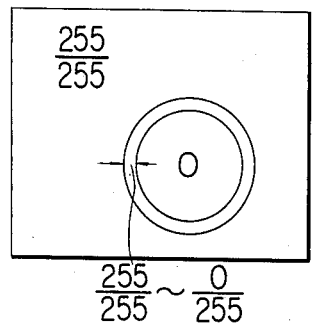
FIG. 18 is a view showing the 8 bit mask which is a negative of the mask shown in FIG. 17.

(2) The image signal for the image A stored in the external storage 20 is written into the main memory 22 through the input control unit 24 under the control of the host computer 26 through a keyboard 36, and a gradation mask signal Sa (see FIG. 18) complementary to the signal Sb stored in the auxiliary memory 34 through the use of the operating unit 38. Then the image signal of the image A and the above gradation mask signal Sa are multiplied to obtain the image signal of the corrected image A as shown in FIG. 8.

(3) The image B stored in the main memory 22 is multiplied by the gradation mask signal Sb forming the image B with a gradated contour which is overlapped with the image signal formed by multiplying the image A stored in the main memory 22 by the gradation mask signal Sa within the operating unit 38, thereby obtaining an image signal of a combined image in which the image pixel density in the vicinity of the interface between the combined images is smoothly sloped at a desired conversion factor.

(4) The above combined image signal is dispayed on the color monitor 28 after it is converted by a digital-to-analogue converter 40 and through a color converter 42. After the results of the operation are confirmed on the color monitor 28, the combined image information suitably processed can be stored in the main memory 22 or the external storage 20 through the output control unit 44.

The second method which utilizes a 1 bit mask comprises the folowing steps;

(1) The 1 bit mask signal prepared by the conventional process and stored in the auxiliary memory 34 is automatically swept by the output signal from the programmable cursor 5 in which the gradation information such as the gradation width a, the gradation configuration, etc. is stored through the input cotrol unit 24 to generate an 8 bit gradation mask signal Sb (see FIG. 17) in the auxiliary memory 34.

(2) After the gradation mask has been formed, the steps (2) to (4) of the first-mentioned method are carried out in the named order to obtain a combined image signal or a combined image.

This second method is particularly convenient when the configuration of the image B to be inserted is a geometrical shape.

The third method, which is suitable when a partial gradating operation is desired rather than the entire length of the interface between the combined images and which is efficient when only the interface between the two images placed side-by-side is to be gradated, comprises the following steps:

(1) The preparation of a 1 bit mask.

(2) The programmable cursor is moved along only the desired portion of the 1 bit mask to form a gradation mask Sb that only partially has 256 grade levels.

(3) Obtaining an image signal of the corrected image A by the same method as in Step (2) of the first method.

(4) Obtaining a combined image signal by overlapping the image signal of the corrected image B and the image A by the same method as in step (3) of the first method.

(5) Displaying on the color monitor or developing on a light sensitive surface the image combined by the same method as in step (4) of the first method.

Figure 20:
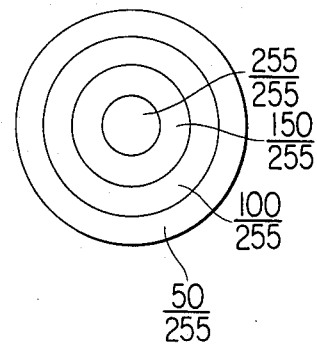
FIG. 20 is a view showing one example of an output pattern of the programmable cursor.

Next, a description will be made of the process for generating an 8 bit mask signal through the use of the programmable cursor. It is to be noted that although in the following description the programmable cursor 5 has concentric circular output zones as shown in FIG. 20, the programmable cursor 5 may output any desired pattern. In FIG. 20, there are four output zones (255/255, 150/255, 100/255 and 50/255).

Figure 24:
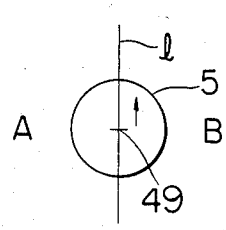
FIGS. 24 and 25 are views showing how the programmable cursor is moved along the interface of the combined images and the output obtained therefrom.
Figure 25:
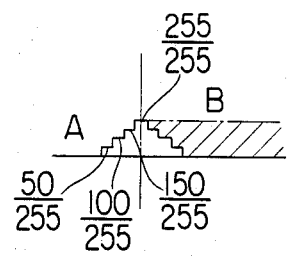

When an 8 bit gradation mask is to be manually formed through the use of the programmable cursor having the above mentioned output zones, the electronic pen 30 is moved on the digitizer table 32 while maintaining the registry of the center 49 (see FIG. 24) of the output of the programmable cursor 5 with respect to the interface 1 between the images A and B. Then a band having a step-like density level with its peak on the interface 1 is formed as shown in FIG. 25. When the electronic pen 30 is moved completely around the closed interface 1 its inside is also entirely swept as shown by the dashed line in FIG. 25 to have a 1 level (255/255), then an 8 bit gradation mask as shown in FIG. 17 is obtained. When the output from the programmable cursor 5 is written in the auxiliary memory 34, the newly output value is always compared with the stored value and the larger value is stored. This operation is carried out by the input control unit 24 shown in FIG. 16.

Figure 19:
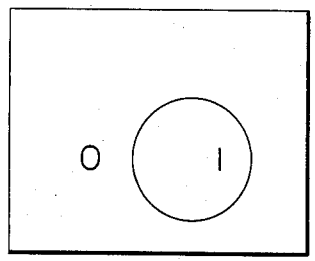
FIG. 19 is a view showing a 1 bit mask.
Figure 21:
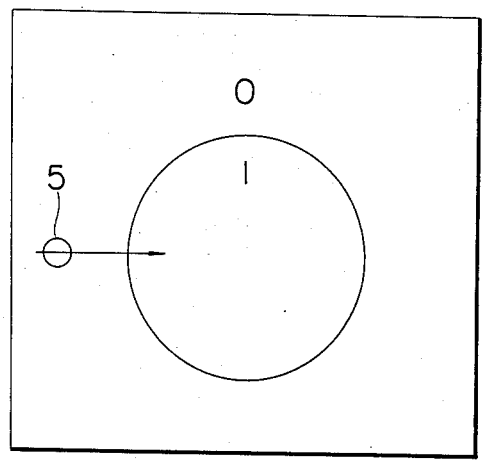
FIG. 21 is a view showing a manner in which a 1 bit mask is swept by the programmable cursor.
Figure 22:
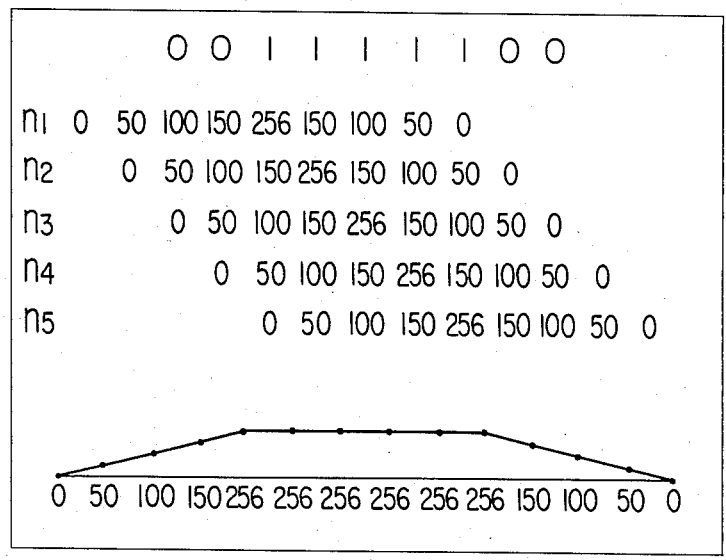
FIG. 22 is a graph illustrating a certain portion of the output from the programmable cursor.

Next a description will be made as to the formation of an 8 bit mask signal by the automatic sweeping of the 1 bit mask shown in FIG. 19 with the programmable cursor. As shown in FIG. 21, when the programmable cursor 5 moves in the direction of the arrow illustrated and detects the first 1 level signal, the programmable cursor 5 concentrically outputs the respective levels of 255/255, 150/255, 100/255 and 50/255 within the auxiliary memory 34. It is to be noted that FIG. 22 illustrates only the output in one line parallel to the direction of the movement of the programmable cursor. When the programmable cursor shifts to the next step the next 1 level signal is detected. The output from the programmable cursor is output as shown in line n₂ in which all the output values are shifted by one step.

Similarly, as long as the programmable cursor detects 1 level similar outputs are provided. And the programmable cursor supplies no output when it detects 0 level. The output values of the programmable cursor and the stored value in the auxiliary memory 34 are compared in each step and the higher value is written in the auxiliary memory 34. The graph in the lower part of FIG. 22 shows the values as obtained by the above-mentioned process and stored within the auxiliary memory 34.

Figure 23:
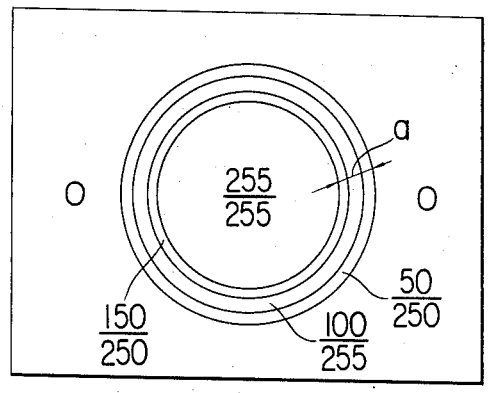
FIG. 23 is a view showing an 8 bit mask.

When the programmable cursor has entirely swept the 1 bit mask shown in FIG. 21, an 8 bit gradation mask as shown in FIG. 23, in which concentric zones of 150/255, 100/255 and 50/255 levels are formed around the 255/255 level zone, is formed because the outputs from the programmable cursor are concentric, only the highest values out of the output signals are stored, and because of the entire sweeping with the 255/255 level of the inside of the 1 bit mask. The gradation width a is determined by the sum of the widths of 150/255, 100/255 and 50/255 zones.

It is to be noted that in the above description, although only three zones of 150/255, 100/255 and 50/255 are involved in the gradation width for the purpose of simplifying the explanation, these zones may be of any number and at any value between 255/255 and 0/255 in accordance with the capacity of the programmable cursor. The value of each above zone corresponds to the density conversion factor.

When the output center of the programmable cursor is shifted from the contour of the image or the 1 bit mask, an 8 bit mask the gradation width of which extends between the both images A and B can be obtained.

Figure 26:
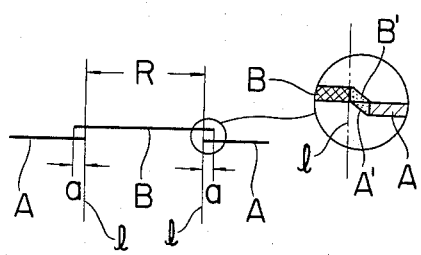
FIGS. 26 to 28 are sectional views explaining the combined images A and B in which the interface portions are overlapped and gradated.
Figure 27:
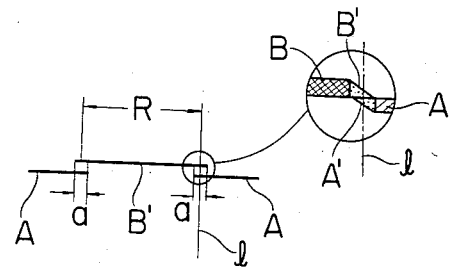

Another process for forming a combined image according to the present invention will now be described in conjunction with FIGS. 26 to 37. In FIG. 26, the image B is combined with or inserted into the image A, and the portion B' that intrudes into the image A from the interface 1 by the width a is gradated, i.e., the densities of the image pixels of the images A and B in this region B' are smoothly changed at the respective conversion factors. Although the region B' is actually a portion of the image C adjacent to the image B, it is described herein as an extended portion of the image B. FIG. 27 shows where the gradation region extends across the both images A and B, and FIG. 28 shows where the gradation width a is inside of the interface 1 between the images A and B.

Figure 28:
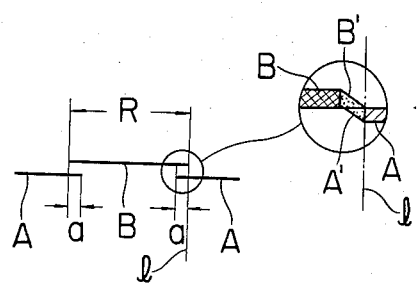
Figure 29:
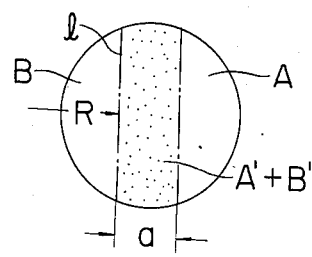
FIGS. 29 to 31 are enlarged plan views illustrating the gradation regions shown in FIGS. 26 to 28.
Figure 30:
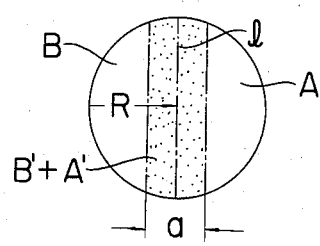
Figure 31:
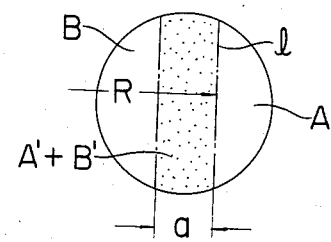

FIGS. 29 to 31 illustrate details of FIGS. 26 to 28 in plan view. The gradation regions are expressed by the dotted area.

FIG. 32 illustrates a process for obtaining an expanded 8 bit mask signal from the 1 bit mask signal of the image B. FIG. 32(a) is a 1 bit mask signal prepared from the image B and therefore the diameter R is equal to that shown in FIG. 3. FIG. 32(b) illustrates an 8 bit mask signal obtained through the use of the programmable cursor for forming an 8 bit mask signal by automatically sweeping the 1 bit mask of FIG. 32(a). The term programmable cursor means an output means for the output of a multi-grade signal on concentric circles and the output shape and the level differences between the grades can be suitably varied. In FIG. 32(b), the regions inside of interface 1 is 255/255 level, i.e., a 1 level region. It is to be noted that the 1 level of the mask signal means that the image signal, particularly the density, is output at 100%, and that the 0 level means that no image signal is output or 0% density is output, and that the level between 0 and 1 means the image signal of the corresponding density is output. Also, a line connecting the equal density level is referred to as an equal density conversion factor curve. Thus, although not illustrated, there are 256 equal density conversion factor curves of from 255/255 to 0/255 within the gradation width a or the region between the line 1 and 1'. FIG. 32(c) shows a new 1 bit mask signal prepared from any one of the 256 equal density conversion factor curves of the 8 bit mask signal shown in FIG. 32(b). The diameter of this new 1 level region is R+2r which is expanded as compared to the original 1 bit mask signal having a diameter of R. The dimension r is shown in FIGS. 33 and 36. FIG. 32(d) shows a new 8 bit mask signal which is newly prepared by the automatic sweeping of the above new 1 bit mask signal with the programmable cursor.

Then, a complementary mask singal complementary to the above new 8 bit mask signal is prepared. The term complementary mask signal means a mask signal in which the 255/255 level is replaced by the 0 level, and the 0 level is replaced by the 255/255 level, and the intermediate 150/255 level for example is replaced by the 100/255 level (250-150/255), and the 50/255 level is replaced by the 205/255 level.

In the above process if the 255/255 density conversion factor curve which is the highest curve is selected when selecting a desired density conversion factor curve of the 8 bit mask signal, the obtained mask will have the same dimensions as the 1 bit mask of the previous step. In this case, the operations as shown in FIGS. 32(c) and 32(d) are not necessary. When this 8 bit mask signal shown in FIG. 32(b) is overlapped to the source signal including the image signals for both the image B and the image C shown in FIG. 2, an image signal is obtained that is for the entire area of the image B that is not density-corrected and for the gradation portion of the width a of the image C that is outside of the image B and that is density-corrected to have a decreasing density at a desired rate of variation within the range of from 255/255 to 0/255 (FIG. 26, B and B' portions). On the ohter hand, when the complementary 8 bit mask signal that is complementary to the above 8 bit mask signal is overlapped to the image signal of the image A, an image signal is obtained in which a portion corresponding to the image B is removed from the image A, and a portion that overlaps with the density-corrected portion (C') of the image C is density-corrected while the other portion is left untouched (FIG. 26, A, and A' portions).

When the density-corrected image A and the density-corrected image B having on its outer periphery the density-corrected image C thus obtained are overlapped, the signals are combined as shown in FIG. 3 to have a density distribution in the vicinity of the interface as shown in FIG. 34 in which the density level is expressed as the height of the graph. From this combined image signal, through the use of a suitable known output device, a combined image in which the portion in the vicinity of the interface is gradated can be obtained.

The image signal of the density corrected image B obtained from the 8 bit mask signal prepared through all the steps shown in FIG. 32 is composed of the entire area of the image B that is not density-corrected, the portion of image C that is not density-corrected and within the area a around the image B, and the gradation portion of width a that is density-corrected to have a gradually decreasing density at any rate of change within the range of from 255/255 to 0/255 and positioned outside of the above image C portion. Similar press as above described is achieved in terms of the image A to obtain the density-corrected image A, and these corrected images A and B are overlapped thereby to obtain the combined image signal. FIGS. 34(a) to 34(c) illustrate density distributions that correspond to FIGS. 26 to 28, respectively.

While the above description has been made where the 1 bit mask signal is converted into an 8 bit mask signal the present invention is not limited to an 8 bit mask signal, and when a high resolution is not necessary the mask signal can be anywhere from a 2 to an 8 bit mask signal in accordance with the application. When the 8 bit mask is used it is sufficiently applicable to artistic pictures requiring high degrees of resolution. A mask of a higher bit number is of course applicable if desired.

The following description will be made as to the case where a contracted 1 bit mask is used. This process is useful where an image cut out from a picture is to be inserted in another image or where a geometrical pattern is automatically formed electrically and the interface between the images is to be positioned within the gradation width.

This process will now be described in conjunction with FIGS. 35 and 36. First, a 1 bit mask signal of the image to be inserted is prepared as shown in FIG. 35(a), and a complementary 1 bit mask signal which is complementary to the above 1 bit mask signal is prepared as shown in FIG. 35(b). Then an 8 bit mask signal is prepared from the complementary 1 bit mask signal by using the programmable cursor as shown in FIG. 35(c), and a new 1 bit mask signal is prepared by selecting any one of the equal density conversion factor curves of the above 8 bit mask signal as shown in FIG. 35(d), and a new 8 bit mask signal is prepared from the above new 1 bit mask signal as shown in FIG. 35(e). The diameter of the equal density conversion factor curve lr of the 8 bit mask signal is smaller than R.

In the above process, upon selecting one of the equal density conversion factor curves of the 8 bit mask signal shown in FIG. 35(c) and preparing a new 1 bit mask signal shown in FIG. 35(d), if 0/255 is selected as the density conversion factor curve, an 8 bit mask signal shown in FIG. 35(e) which enables only the inside of the outline of the image B to be gradated can be made (see FIG. 28). If a density conversion curve larger than 0/255 and smaller than 255/255 is selected, both images A and B at the opposite sides of the interface can be gradated as shown in FIG. 27. When it is desired to increase the rate of reduction, the operations shown in FIGS. 35(a) to 35(d) should be simply repeated as required.

FIG. 37 is a graph showing some examples of the density conversion factor that can be selected by the programmable cursor. It is also possible to prepare the 8 bit mask signal by the programmable cursor directly from the image B rather than using the 1 bit mask signal, and the desired mask signal can be obtained by utilizing the 8 bit mask signal thus obtained and carrying out similar steps as previously described.

The above described process of the present invention can be achieved by the apparatus shown in FIG. 16. When it is desired to prepare a 1 bit mask signal of the image B the image B stored in the external storage 20 is displayed on the color monitor 28 and the electronic pen 30 is moved on the digitizer 32 along the contour of the image B on the monitor. Then the 1 bit mask signal of the image B (FIG. 32(a)) is written in the auxiliary memory 34. Next the programmable cursor 5 is instructed as to the desired gradation width a and the density conversion factor through the keyboard 36, and the 1 bit mask signal stored in the auxiliary memory 34 is automatically swept by the programmable cursor to prepare an 8 bit mask signal as shown in FIG. 32(b). This mask signal is written in and stored in the auxiliary memory 34 or may be displayed on the color monitor and judged as to its quality.

In order to select a desired equal density conversion factor curve of the 8 bit mask signal, the necessary keys of the keyboard 36 are depressed to select the one desired to prepare a new 1 bit mask signal. The previously described step is repeated to prepare a new 8 bit mask signal from this new 1 bit mask signal.

A complementary mask signal that is complementary to this mask signal is prepared by the operating unit 38 and is written into the auxiliary memory 34.

The 8 bit gradation mask signal is then multiplied by the image signals of the image A or B written in the main memory 22 to obtain the density-corrected image A signal or the density-corrected image B signal or a desired combined image signal. This combined image signal is stored within the external storage 20 under the control of the host computer 26, and this stored image information can be converted into a visible image by a suitable output means. In order to display the operating procedure of the system, a system console monitor 46 which is controlled by a micro-computer 48 is provided.

According to the present invention, the combined image has interfaces between the combined images which has a density gradation that is smoothly sloped from one image to the other in the vicinity of the interface and which has image information that gradually weakens towards the combined image. Therefore, the images can be very natural at the interface, giving no odd impressions to the viewer. Also, the gradation width and the gradation position can be very finely adjusted.

What is claimed is:

1. An apparatus for forming a combined image signal from a plurality of image signals representative of a plurality of images, comprises a main memory for storing image signals; an auxiliary memory for storing gradation signals; means for preparing gradation mask signal comprising a programmable cursor, a digitizdr table, an electronic pen for writing on said digitizer table, an input key board, and a microcomputer controlling said digitizer table and key board: an input control unit for reading the necessary mask signals from said auxiliary memory and for successively inputting and comparing the signal from said programmable cursor to generate a gradation mask signal and write it into said auxiliary memory; an operating unit having operating function for reading the gradation mask signal in said auxiliary memory and the image signal in said main memory; an output control unit for controlling the operating signal; a converter for converting a digital signal from said output control unit into an analogue signal; a color monitor for displaying the output of said converter; and a host computer for controlling the above-mentioned devices, whereby the density difference of the combined images at the interface is smoothed out by a correcting factor to gradate the interface.

2. An apparatus as claimed in claim 1, further comprising a console monitor controlled by said microcomputer for displaying the operating procedure of said apparatus.

3. A process for forming a combined still image signal by combining an image signal representing an image A with an image signal representing an image B, said process comprising;
   modifying one of the image signals representative of one of said images with respect to its image density within a predetermined distance a only from an interface I between said images A and B so that the image density thereof is gradually varied from said predetermined distance toward said interface I at a desired rate of variation, said modifying step comprising:
   determining a density conversion factor α according to which density E of said image B gradually decreases from 1 at said interface I to 0 at a point H spaced said distance a from said interface, and determining a density conversion factor β according to which density F of image A gradually decreases from 1 at point H to 0 at point I, and
   multiplying image B by the conversion factor α and multiplying image A by the conversion factor β and adding density corrected image and density corrected image to obtain a combined image in which the boundary between the combined images is smoothed by a density variation only in the region between said points H and I.

4. A process for forming a combined image signal from a plurality of image signals representative of a plurality of images to combined with an interface between said images, comprising the steps of:
   setting up the size and the position of a first and second image to be combined with an overlap of a width a along said interface;
   obtaining a density-corrected first image signal by multiplying a suitably selected density conversion factor by the first image to gradually decrease the density of each image pixel signal within the width a toward the second image;
   obtaining a density-corrected second image signal by multiplying a suitably selected density conversion factor by the second image to gradually decrease the density of each image pixel signal with the width a toward the first image; and
   gradating in the vicinity of the interface between the images through the use of an output means after a combined image signal has been obtained by overlapping the density-corrected first and second image signals, said steps of obtaining the density-corrected first and second image signals comprising the steps of preparing a 1 bit mask signal for determining a boundary between the first and the second images; preparing a multi-bit mask signal having equal density conversion factors of a plurality of grades from said 1 bit mask signal; selecting a desired equal density conversion factor curve from said multi-bit mask signal; preparing a new 1 bit mask signal that is larger than said first 1 bit mask signal on the basis of the selected equal density conversion factor curve; preparing a density-corrected first image signal by multiplying said new 1 bit mask signal by said first image signal; preparing a complementary mask signal that is complementary to said new multi-bit mask signal; and preparing a density-corrected second image signal by multiplying the complementary mask signal by said second image signal.

5. A process as claimed in claim 4, wherein the density conversion factor for the first image and the density conversion factor for the second image to be combined are in complementary relationship to each other.

6. A process for forming a combined image signal from a plurality of image signals representative of a plurality of images to be combined with an interface between said images; comprising the steps of:
   setting up the size and the position of a first and a second image to be combined with an overlap of a width a along said interface;
   obtaining a density-corrected first image signal by multiplying a suitably selected density conversion factor by the first image to gradually decrease the density of each image pixel signal within the width a toward the second image;
   obtaining a density-corrected second image signal by multiplying a suitably selected density conversion factor by the second image to gradually decrease the density of each image pixel signal within the width a toward the first image; and
   gradating in the vicinity of the interface between the images through the use of an output means after a combined image signal has been obtained by overlapping the density-corrected first and second image signals,
   said steps of obtaining density corrected first and second image signals comprising the steps of preparing a 1 bit mask signal for determining a boundary between the first and the second images; preparing a complementary 1 bit mask signal that is complementary to said 1 bit mask signal; preparing a multi-bit mask signal having equal density conversion factor curves corresponding to density conversion factors of a plurality of grades from said complementary 1 bit mask signal; selecting a desired equal density conversion factor curve from said multi-bit mask signal; preparing a new 1 bit mask signal that is smaller than said first 1 bit mask signal on the basis of the selected equal density conversion factor curve; preparing a new multi-bit mask signal from said 1 bit mask signal; preparing a density-corrected first image signal by multiplying said new multi-bit mask signal by said first image signal; preparing a complementary mask signal that is complementary to said new multi-bit mask signal; and preparing a density-corrected second image signal by multiplying the complementary mask signal by said second image signal.

7. A process for forming a combined image signal from a plurality of image signals representative of a plurality of images to be combined with an interface between said images; comprising the steps of:
   setting up the size and the position of a first and a second image to be combined with an overlap of a width a along said interface;
   obtaining a density-corrected first image signal by multiplying a suitably selected density conversion factor by the first image to gradually decrease the density of each image pixel signal within the width a toward the second image;
   obtaining a density-corrected second image signal by multiplying a suitably selected density conversion factor by the second image to gradually decrease the density of each image pixel signal within the width a toward the first image; and gradating in the vicinity of the interface between the images through the use of an output means after a combined image signal has been obtained by overlapping the density-corrected first and second image signals, said steps of modifying the first and the second image signals comprising the steps of preparing a multi-bit mask signal having equal density conversion factor curves corresponding to a density conversion factor of a plurality of grades from one of said first and second image signals; selecting a desired equal density conversion factor curve from said multi-bit mask signal; preparing a 1 bit mask signal on the basis of the selected equal density conversion factor curves; preparing a new multi-bit mask signal on the basis of said 1 bit mask signal; preparing one of said density-corrected image signals by multiplying said new multi-bit mask signal by said one of the image signals; preparing a complementary mask signal that is complementary to said new multi-bit mask signal; and preparing the other of said density-corrected image signals by multiplying said complementary mask signal by the other image signal.

8. A process for forming a combined still image signal from a plurality of image signals representing a plurality of images with a boundary between images comprising the steps of:

storing image signals obtained by scanning the images to be combined, as digital signals, preparing a gradation mask signal for varying the image density of a region of predetermined with only along the boundary between images to be combined and storing said gradation mask signal as a digital signal, forming from said stored image signals and said gradation mask signal an image signal in which the density of that portion of the image in said boundary region only is modified according to said gradation mask signal, preparing a single combined image by mixing the modified image signals, and storing said single combined image signal, the aforesaid steps being accurately controlled and performed by an electronic computer.

9. A process as claimed in claim 8, wherein said digital graduation mask signal is a signal of at least 8 bit which is adaptable to at least 255 grade levels for obtaining high quality reproduction of the original images.

10. A process as claimed in claim 8, wherein a plurality of various gradation mask signals are stored in a memory, a selected gradation mask signal being taken out and used for modifying that portion of an image in said boundary region.

11. A process as claimed in claim 8, wherein the original image and combined image are contemporaneously displayed on a monitor screen so that the width and pattern of the gradated boundary region can be modified and corrected at any position while the displayed image is being visually monitored.

12. A process as claimed in claim 8, wherein said gradation mask signal is prepared by displaying the contour of an image to be inserted on a monitor screen of a digitizer table and manually moving an electronic pen along said countour.

13. A process as claimed in claim 8, wherein the contour of an image to be inserted is a geometrical shape which is stored in a memory as a digital signal and wherein said gradation mask signal is prepared by automatically scanning said geometrical shape with a programmable cursor.

* * * * *